United States Patent
Wang et al.

(10) Patent No.: US 11,907,295 B2
(45) Date of Patent: Feb. 20, 2024

(54) METHOD FOR REVERSE REAL-TIME MATCHING BASED ON EVENT-DRIVEN GRAPH PATTERNS

(71) Applicant: ZHEJIANG BANGSUN TECHNOLOGY CO., LTD., Zhejiang (CN)

(72) Inventors: Xingen Wang, Hangzhou (CN); Xinyu Wang, Hangzhou (CN); Lu Jin, Hangzhou (CN); Wei Chen, Hangzhou (CN); Ping Lu, Hangzhou (CN); Yang Gao, Hangzhou (CN); Tao Huang, Hangzhou (CN)

(73) Assignee: ZHEJIANG BANGSUN TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 17/866,543

(22) Filed: Jul. 17, 2022

(65) Prior Publication Data
US 2022/0365977 A1 Nov. 17, 2022

Related U.S. Application Data

(63) Continuation of application No. PCT/CN2020/116653, filed on Sep. 22, 2020.

(51) Int. Cl.
*G06F 16/901* (2019.01)
*G06F 18/22* (2023.01)

(52) U.S. Cl.
CPC ......... *G06F 16/9024* (2019.01); *G06F 18/22* (2023.01)

(58) Field of Classification Search
CPC ... G06F 16/9024; G06F 18/22; G06F 16/9035
See application file for complete search history.

(56) References Cited

U.S. PATENT DOCUMENTS

| 5,701,460 A * | 12/1997 | Kaplan | ............ G06F 16/24526 707/779 |
| 8,386,377 B1 * | 2/2013 | Xiong | .................. G06Q 20/04 707/706 |

(Continued)

FOREIGN PATENT DOCUMENTS

| CN | 103310350 A | 9/2013 |
| CN | 103546916 A | 1/2014 |

(Continued)

OTHER PUBLICATIONS

International Search Report (PCT/CN2020/116653); dated Mar. 10, 2021.

*Primary Examiner* — Angelica Ruiz
(74) *Attorney, Agent, or Firm* — W&G Law Group (57) ABSTRACT

Provided is a method for reverse real-time matching based on event-driven graph patterns. The method includes definition of a graph pattern, establishment of reverse matching architecture and a reverse matching method; and the graph pattern is used for describing a spatial connection relationship among vertices and edges in a graph in a reverse order and attribute constraints thereof, and includes a linked list of matching steps and matching contexts. Reverse real-time matching of the graph pattern is realized according to the reverse matching architecture, and the problem of event-driven subgraph matching in a real-time scene is solved.

3 Claims, 7 Drawing Sheets

(56) References Cited

U.S. PATENT DOCUMENTS

2017/0169133 A1* 6/2017 Kim .................... G06F 16/9024
2020/0120118 A1 4/2020 Shu et al.

FOREIGN PATENT DOCUMENTS

| CN | 105045790 A | 11/2015 |
| CN | 111737538 A | 10/2020 |
| WO | 2017052539 A1 | 3/2017 |

* cited by examiner

```
01 new GraphPattern("Fraudulent Application")
02   .step("app", { v, ctx -> v.type == "APPLICATION" },
03         "e0",  { e, ctx -> true }),
04   .step("p0",  { v, ctx -> v.type == "PEOPLE" },
05         "e1",  { e, ctx -> true }),
06   .step("v0",  { v, ctx -> v.type == "PHONE" || v.type == "MAIL" },
07         "e2",  { e, ctx -> true }),
08   .fin ("p1",  { v, ctx -> v.type == "PEOPLE"
09                && v.id != ctx.get("p0").id
10                && v.get("fraud") == true })
```

METHOD FOR REVERSE REAL-TIME MATCHING BASED ON EVENT-DRIVEN GRAPH PATTERNS

CROSS-REFERENCE TO RELATED APPLICATIONS

The present application is a continuation of International Application No. PCT/CN2020/116653, filed on Sep. 22, 2020, which claims priority to Chinese Application No. 202010529430.8, filed on Jun. 11, 2020, the contents of both of which are incorporated herein by reference in their entireties.

TECHNICAL FIELD

The present disclosure relates to the field of graph retrieval, in particular to a method for reverse real-time matching based on event-driven graph patterns.

BACKGROUND

A graph is composed of a series of vertices and edges and their attributes, and it can naturally express a complex relationship between entities. In social networks, graphs can be used for expressing multilevel friendships, so as to discover multilevel incidence relations such as "a friend of a friend of a friend of a friend" and so on. In the field of public security, the graphs can be used for describing the connections between criminals, so as to discover criminal gangs. Specifically, a graph pattern defines a graph topological structure including a series of vertices and edges, as well as specific attribute constraint relationships among these vertices and edges. Graph pattern matching refers to finding a subgraph matching a given graph pattern in graph data, so that the subgraph satisfies the topological structure and the attribute constraint relationship of the graph pattern. In an event-driven real-time scene, the graph pattern matching has the following several aspects of characteristics:

(1) Pattern matching starting from fixed vertices. Graph data will continuously change as events occur, such that new vertices and edges are formed, and graph pattern matching results also continuously change. Therefore, a graph pattern matching problem is transformed from a global subgraph search problem into a graph pattern matching problem starting from fixed vertices, that is, the vertices and edges that change due to the events will become final vertices of pattern matching or edges leading to the final vertices.

(2) Low-delay graph pattern matching. Due to the continuous changes of the graph data, if the pattern matching speed is too slow, on one hand, it does not meet the needs of real-time scenes; and on the other hand, underlying graph data in the matching result are inconsistent due to high delay, resulting in an incorrect matching result. Therefore, event-driven pattern matching has higher requirements for the low delay of the system.

(3) Usability is higher than accuracy. Event-driven graph matching is used in the real-time scenes, so the requirements for the availability of the system are higher. If a vertex with high degree is encountered during the matching process, the computation complexity will rise significantly, and resources will be exhausted, resulting in a situation where the system is unavailable. Therefore, certain resource limits need to be set for the matching process, so as to ensure that the system is available at the expense of matching accuracy of some scenes.

Based on the above characteristics, the present disclosure proposes a method for reverse real-time matching based on event-driven graph patterns, which extracts fixed vertices from event data, and performs reverse matching from this vertex to quickly find a target graph pattern.

SUMMARY

The purpose of the present disclosure is to propose a method for reverse real-time matching based on event-driven graph patterns, to solve the problem of event-driven subgraph matching in real-time scenes. The present disclosure includes implementation of graph pattern definition, reverse matching architecture and reverse matching method, which are used for enhancing an existing graph computing engine, and supporting real-time graph matching, query analysis and other scenes in the fields of finance, e-commerce, logistics and public security.

The purpose of the present disclosure is achieved through the following technical solutions: a method for reverse real-time matching based on event-driven graph patterns, including the following steps:

(1) definition of a graph pattern:

the graph pattern is used for describing a spatial connection relationship among vertices and edges in a graph in reverse order and attribute constraints thereof, and specifically, includes a linked list of matching steps and matching context;

the matching contexts are used for storing intermediate results of a matching process, and supporting matching conditions of non-adjacent vertices or edges;

the linked list of matching steps includes matching steps connected in series in the form of a linked list, and each matching step includes the following content:

a. Vertex Predicate (vp for short): according to various attributes of a vertex, combined with the matching context, determining whether the current vertex meets the matching conditions;

b. Edge Predicate (ep for short): according to the various attributes of an edge, combined with the matching contexts, determining whether the current edge meets the matching conditions;

(2) establishment of reverse matching architecture:

The reverse matching architecture supports graph pattern matching and graph pattern management, and includes the following components:

a. Session Manager: responsible for creating and managing a matching session, restricting the behavior of the matching session according to session configuration information, and managing the life cycle of the matching session; the session manager is also responsible for adding and deleting all graph patterns, and limiting the number of concurrent matching sessions.

b. Matching Session: upon receiving a matching request, the session manager creates a matching session to perform an actual graph matching operation; the matching session includes a working graph loader, a working graph, a graph pattern matcher and a subgraph matching pool, and after the matching ends, the session manager returns a result set and ends the life cycle of the matching session.

The working graph loader: according to the matching requirements and progress, loading corresponding vertices and edges from an underlying graph data storage (Graph Storage) to form a working graph for reverse matching, the working graph loader also needs to abide by various conditional constraints issued by the session manager to the matching session, so as to prevent the matching process from occupying too many resources or time.

The working graph: loading the related underlying graph data into the current matching session, so that the graph pattern matcher can quickly access and traverse the underlying graph data.

The subgraph matching pool: used for storing subgraph instances generated according to different graph patterns and matching progresses; the subgraph instance includes the following content:

MatchingSteps: pointing to the linked list of matching steps of the graph pattern corresponding to the current subgraph instance.

NextStep: pointing to the next matching step required for the current subgraph instance;

NextVertex: pointing to the next vertex that needs to be loaded and matched, and the working graph loader loads into the working graph during the next matching step.

MatchingContext: pointing to the matching context generated in a subgraph matching process, implemented in a dictionary structure that stores intermediate results of the matching process and information that needs to be temporarily stored in the form of key-value pairs.

MatchingResult: the matching result records the various vertices and edges that meet the matching step in the form of a list.

The graph pattern matcher: controlling the overall process of reverse matching.

c. Session configuration: storing relevant configuration parameters of the matching session, including: the maximum number of vertices of the working graph, the maximum number of edges of the working graph, the maximum traversal depth and the maximum matching duration.

d. Registered graph patterns: containing all graph patterns that need to be matched in real time, as well as the mapping relationships between events and the graph patterns.

(3) Reverse matching method:

(3.1) After receiving an event, the session manager initializes the entire matching process, including:

(3.1.1) The session manager looks for a set of corresponding starting vertices from the received event according to requirements, and looks for a graph pattern corresponding to the current event from the registered graph patterns; if the corresponding starting vertices cannot be found, or if the corresponding graph pattern cannot be found, the session manager directly returns an empty result set.

(3.1.2) The session manager creates a corresponding matching session according to the session configuration, initializes the graph pattern matcher, the subgraph matching pool and the working graph loader; at the same time, the session manager constructs a corresponding subgraph instance according to the starting vertices and the graph pattern, and places the subgraph instance in the subgraph matching pool.

(3.2) The graph pattern matcher traverses the subgraph instances in the subgraph matching pool, and performs the following loop operations:

(3.2.1) Taking out the current subgraph instance and deleting it from the subgraph matching pool.

(3.2.2) Looking for the vertex corresponding to NextVertex of the current subgraph instance from the working graph, and verifying whether NextVertex meets the attribute constraints of the vertex predicate in NextStep; if the NextVertex does not meet the constraints, destroying the current subgraph instance, and returning to step (3.2.1) to take the next subgraph instance; otherwise, adding the vertex into a matching result list MatchingResult of the current subgraph instance, and continuing the next operation.

(3.3.3) If the edge predicate in NextStep is empty, ending the match process, adding the current matching subgraph instance into the result set, and returning to step (3.2.1); if the edge predicate in NextStep is not empty, continuing to load all edges pointing to NextVertex, and determining whether the loaded edges meet the attribute constraints of the edge predicate one by one, if an edge e that meets the attribute constraints of the edge predicate is found, the graph pattern matcher will copy the current subgraph instance and perform the following operations:

a. Adding the edge e into the MatchingResult of the copied subgraph instance.

b. Setting NextVertex of the new instance as the starting vertex of the edge e.

c. Setting NextStep of the new instance as a subsequent matching step of the current matching step.

d. Finally, the graph pattern matcher adds the new subgraph instance into the subgraph matching pool.

After traversing of all edges, the graph pattern matcher destroys the current subgraph instance.

(3.3) Repeating step (3.2), until one of the following conditions is met:

a. The subgraph matching pool is empty, and there is no subgraph instance for matching.

b. The scale of the working graph exceeds the limit in the session configuration, including: the number of vertices or edges in the working graph exceeds the limit, or the depth of the working graph exceeds the limit.

c. The time of the entire reverse matching exceeds a pre-configured time limit; and (3.4) the graph pattern matcher returns the result set, clears the subgraph matching pool and the working graph, and ends the current matching session.

Further, the attributes of the vertices or edges are used for describing the features or categories of the vertices or edges themselves.

Further, the graph pattern further includes a next step pointer, which points to the next matching step in the linked list of matching steps.

The beneficial effects of the present disclosure are as follows:

1. the fixed vertex subgraph matching can be completed in seconds. Since the graph matching is completed in a memory, and the data loading of the graph only depends on the loading of specific vertices and edges, the overall matching delay is lower, and response delay of seconds or even milliseconds can be achieved, which is suitable for real-time scenes.

2. Effective balance of performance and accuracy is achieved. The present disclosure provides matching restriction mechanisms such as a working graph scale and a matching time, so as to ensure that when the system encounters a vertex with large in-degree, the system does not crash due to memory limitations, it also ensures that the system will not be blocked due to matching timeout, and the recall ratio of the matching process and the availability of the system are balanced.

3. Concurrent matching of a large number of graph patterns is supported. Since the complete matching process is stateless, multiple matching nodes can be deployed to horizontally expand the matching performance of the system, thereby achieving the concurrent matching of a large number of graph patterns.

4. Multiple forms of underlying graph data storage are supported. The present disclosure does not rely on an underlying graph data storage mechanism, but introduces a working graph mechanism, and uses the working graph loader to query and import graph data such as the vertices and the edges from other systems, so that the present disclosure can be integrated with other graph databases, graph retrieval computing platforms and big data platforms.

DESCRIPTION OF EMBODIMENTS

The specific embodiments of the present disclosure will be described in further detail below in conjunction with the drawings.

Figure 1:
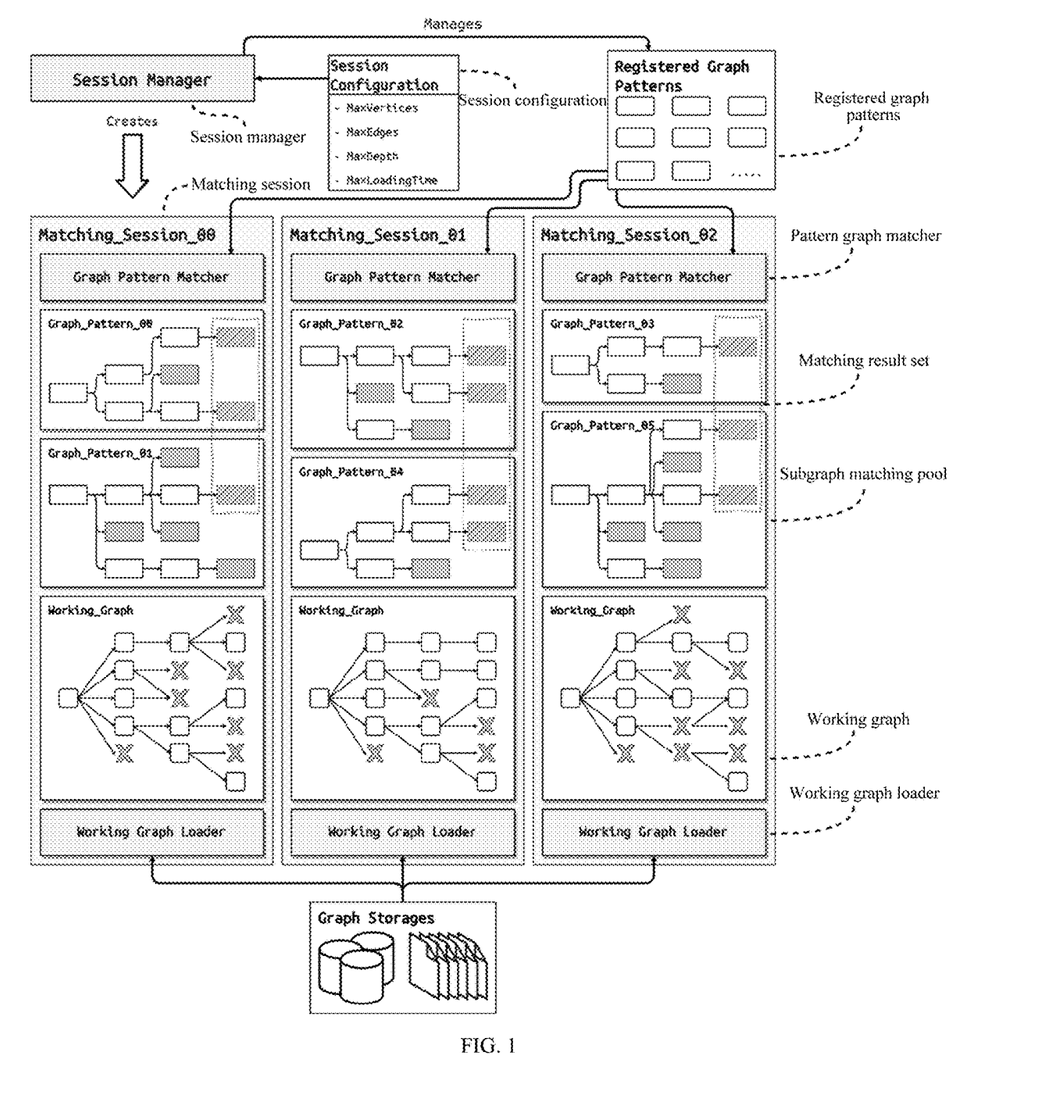
FIG. 1 is an exemplary diagram of graph pattern definition.

The present disclosure provides a method for reverse real-time matching based on event-driven graph patterns. The method includes the following steps:

(1) Definition of a graph pattern:

The graph pattern is used for describing a spatial connection relationship among vertices and edges in a graph in reverse order and attribute constraints thereof, and specifically, includes a linked list of matching steps and matching contexts; and The matching context is used for storing intermediate results of a matching process, and supporting matching conditions of non-adjacent vertices or edges; and FIG. 1 defines a basic graph pattern of "a friend of a friend". By using the context, the name attributes of the two vertices are required to be inconsistent, so as to avoid a matching result that "a friend of a friend is oneself".

The linked list of matching steps includes matching steps connected in series in the form of a linked list, and each matching step includes the following content:

a. Vertex Predicate (vp for short): according to various attributes of a vertex, combined with the matching contexts, determining whether the current vertex meets the matching conditions.

b. Edge Predicate (ep for short): according to the various attributes of an edge, combined with the matching contexts, determining whether the current edge meets the matching conditions.

c. next step pointer, pointing to its next matching step.

Since no continued matching is needed in the last matching step, it only contains the vertex predicate vp, and the edge predicate and subsequent matching steps are all empty. The edge predicate of the matching step step02 in FIG. 1 is empty, and it does not point to the subsequent matching steps.

The attributes of the vertices or edges are used for describing the characteristics or categories of the vertices or the edges themselves.

Figure 2:
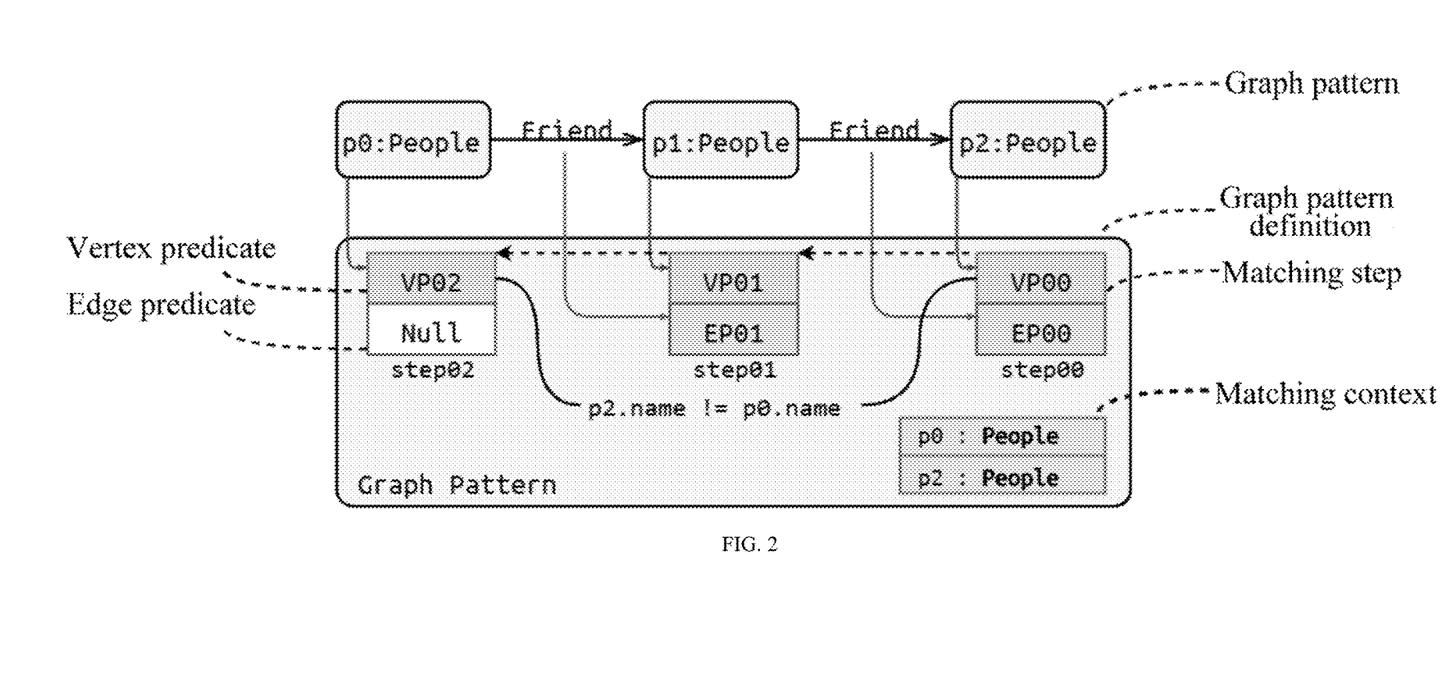
FIG. 2 is a reverse matching system architecture diagram.
Figure 3:
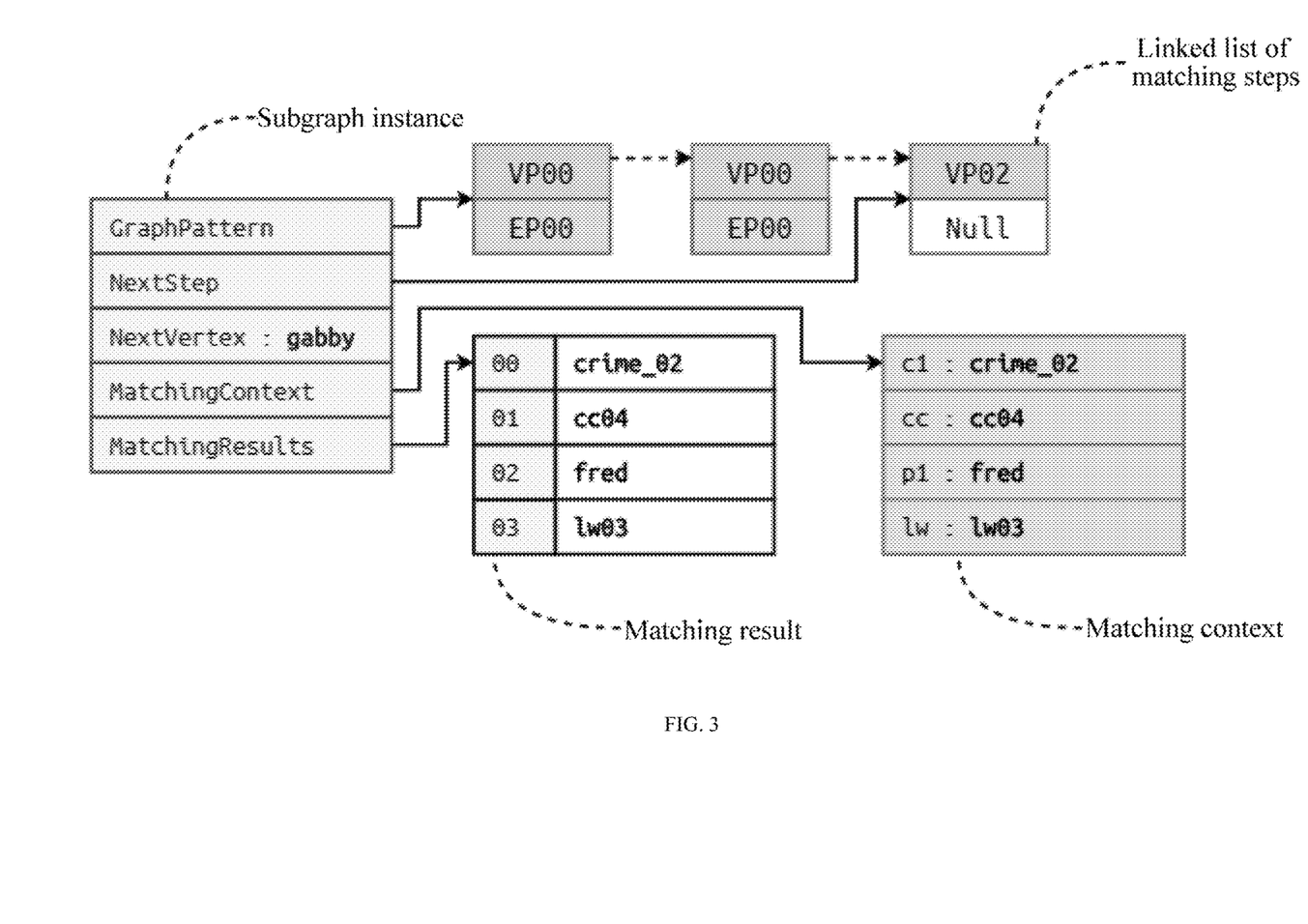
FIG. 3 is a schematic diagram of a data structure of a subgraph instance.

(2) Establishment of reverse matching architecture:

The reverse matching architecture supports graph pattern matching and graph pattern management, its entire architecture is as shown in FIG. 2, and the reverse matching architecture includes the following components:

a. Session Manager: responsible for creating and managing a matching session, restricting the behavior of the matching session according to session configuration information, and managing the life cycle of the matching session; and the life cycle of the matching session refers to creation, initialization, destruction and other steps of the matching session. The session manager is also responsible for adding and deleting all graph patterns, and limiting the number of concurrent matching sessions. In a distributed environment, the session manager can perform larger-scale task scheduling and achieve horizontal expansion, in combination with resource managers such as YARN.

b. Matching Session: upon receiving a matching request, the session manager creates a matching session to perform an actual graph matching operation; the matching session includes a working graph loader, a working graph, a graph pattern matcher and a subgraph matching pool, and after the matching ends, the session manager returns a result set and ends the life cycle of the matching session.

The working graph loader: according to the matching requirements and progress, loading corresponding vertices and edges from an underlying graph data storage (Graph Storage) to form a working graph for reverse matching, the working graph loader also needs to abide by various conditional constraints issued by the session manager to the matching session, so as to prevent the matching process from occupying too many resources or time.

The working graph: loading the related underlying graph data into the current matching session, so that the graph pattern matcher can quickly access and traverse the underlying graph data.

The subgraph matching pool: used for storing subgraph instances generated according to different graph patterns and matching progresses; the subgraph instance includes the following content:

MatchingSteps: pointing to the linked list of matching steps of the graph pattern corresponding to the current subgraph instance.

NextStep: pointing to the next matching step required for the current subgraph instance.

NextVertex: pointing to the next vertex that needs to be loaded and matched, and the working graph loader loads the working graph during the next matching step.

MatchingContext: pointing to the matching context generated in a subgraph matching process, being implemented in a data structure of a dictionary, and storing intermediate results of the matching process and information that needs to be temporarily stored in the form of key value pairs.

MatchingResult: the matching result records the various vertices and edges that meet the matching step in the form of a list.

The graph pattern matcher: controlling the overall process of reverse matching.

c. Session configuration: storing relevant configuration parameters of the matching session, including: the maximum number of vertices of the working graph, the maximum number of edges of the working graph, the maximum traversal depth and the maximum matching duration.

d. Registered graph patterns: containing all graph patterns that need to be matched in real time, as well as the mapping relationships between events and the graph patterns.

(3) Reverse matching method:

(3.1) After receiving an event, the session manager initializes the entire matching process, including:

(3.1.1) The session manager looks for a set of corresponding starting vertices from the received event according to requirements, and looks for a graph pattern corresponding to the current event from the registered graph patterns; if the corresponding starting vertices cannot be found, or if the corresponding graph pattern cannot be found, the session manager directly returns an empty result set.

(3.1.2) The session manager creates a corresponding matching session according to the session configuration, initializes the graph pattern matcher, the subgraph matching pool and the working graph loader; at the same time, the session manager constructs a corresponding subgraph instance according to the starting vertices and the graph pattern, and places the subgraph instance in the subgraph matching pool.

(3.2) The graph pattern matcher traverses the subgraph instances in the subgraph matching pool, and performs the following loop operations:

(3.2.1) Taking out the current subgraph instance and deleting it from the subgraph matching pool.

(3.2.2) Looking for the vertex corresponding to NextVertex of the current subgraph instance from the working graph, and verifying whether NextVertex meets the attribute constraints of the vertex predicate in NextStep; if the NextVertex does not meet the constraints, destroying the current subgraph instance, and returning to step (3.2.1) to take the next subgraph instance; otherwise, adding the vertex into a matching result list MatchingResult of the current subgraph instance, and continuing the next operation.

(3.3.3) If the edge predicate in NextStep is empty, ending the matching, adding the current matching subgraph instance into the result set, and returning to step (3.2.1); if the edge predicate in NextStep is not empty, continuing to load all edges pointing to NextVertex, and determining whether the loaded edges meet the attribute constraints of the edge predicate ep one by one, if an edge e that meets the attribute constraints of the edge predicate is found, the graph pattern matcher will copy the current subgraph instance and perform the following operations:

a. Adding the edge e into the MatchingResult of the copied subgraph instance.

b. Setting NextVertex of the new instance as the starting vertex of the edge e.

c. Setting NextStep of the new instance as a subsequent matching step of the current matching step.

d. Finally, the graph pattern matcher adds the new subgraph instance into the subgraph matching pool.

After traversing of all edges, the graph pattern matcher destroys the current subgraph instance.

(3.3) Repeating step (3.2), until one of the following conditions is met:

a. The subgraph matching pool is empty, and there is no subgraph instance for matching.

b. The scale of the working graph exceeds the limit in the session configuration, including: the number of vertices or edges in the working graph exceeds the limit, or the depth of the working graph exceeds the limit.

c. The time of the entire reverse matching exceeds a pre-configured time limit.

(3.4) The graph pattern matcher returns the result set, clears the subgraph matching pool and the working graph, and ends the current matching session.

Figure 4:
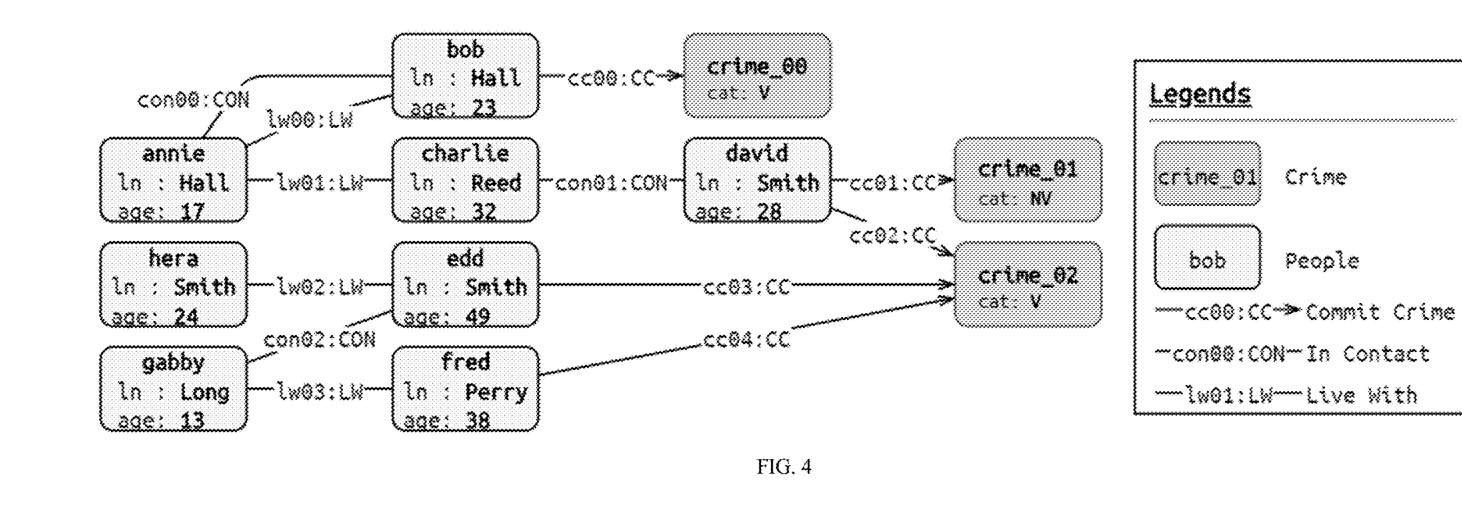
FIG. 4 is an exemplary diagram of people relationship in a public security scene.

The specific implementation method of reverse matching will be described below in combination with actual use cases. In the field of public security, it is necessary to protect minors in high-risk environments, and to identify and protect the minors living with violent criminals. FIG. 4 depicts an exemplary diagram of the relationship among cases and people. The vertices of the graph are represented by squares. There are two types of vertices: case and people. The first line of text in the vertex is the unique identifier ID of the vertex, and each subsequent line describes an attribute of the vertex and a corresponding value of the attribute, for example: ln represents the last name of a person, age represents age, cat represents the category of crime, and V represents violent crime, and NV represents non-violent crime. The edge in the figure is represented by lines between the vertices, and the texts on the line indicate the unique ID of the edge and the type of the edge. For example: cc00:CC indicates that the ID of the edge is cc00, the type CC indicates Commit Crime, and the meaning of this edge is that bob is a criminal who participated in crime_00.

Figure 5:
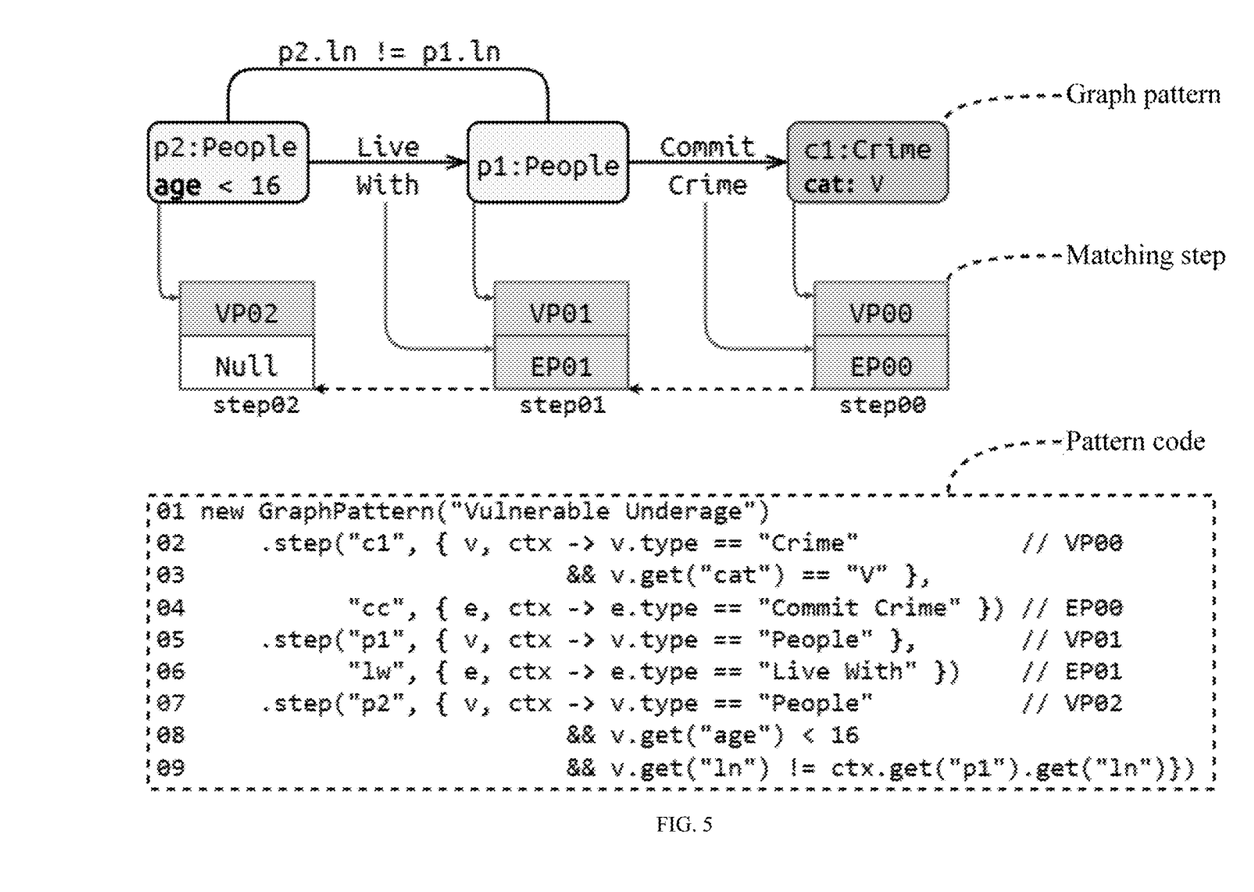
FIG. 5 is an exemplary diagram of a "Vulnerable Underage" graph pattern.

When a certain violent crime case occurs, it is necessary to find out whether there are minors who are less than 16 years old and living with the criminals involved in this case and have no immediate family relationship with the criminals. This relationship needs to be expressed through graph patterns. FIG. 5 describes the matching graph patterns, reverse matching steps and corresponding pattern definition codes. Each matching step contains a vertex predicate vp and an edge predicate ep, which describe the attributes of a vertex and an edge in the graph pattern. The last matching step step01 includes only one vertex predicate. Due to the event-driven nature, the direction of the edges in the graph pattern is opposite to the order of the matching steps, that is, the last vertex in the graph pattern is a fixed vertex that is matched first.

Figure 6:
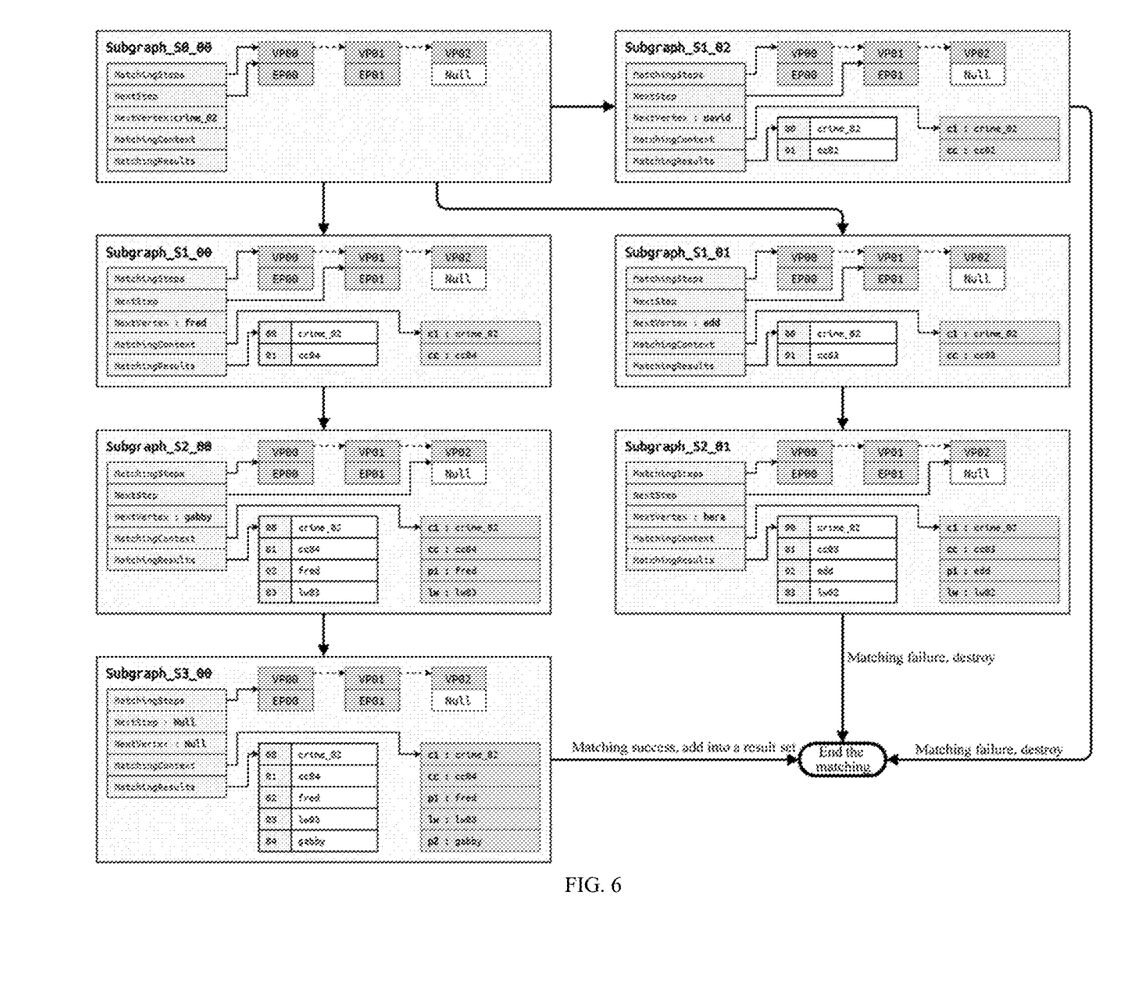
FIG. 6 is a schematic diagram of a matching process of the "Vulnerable Underage" graph pattern.

In the pattern code in FIG. 5, the "Vulnerable Underage" pattern is clearly defined by using the Java language as the reference implementation language of the pattern. Each matching step is defined by a step function that contains 4 parameters: vertex name, vertex predicate, edge name and edge predicate. The second to the fourth lines of codes in FIG. 5 describes the matching step step00. In the second to the third line of codes, the string c1 represents the vertex name, the subsequent lambda expression describes the corresponding vertex predicate, the type of the vertex is required to be Crime, and its cat attribute is V, that is, c1 is a vertex of a violent case. In the fourth line of codes, the string cc represents the edge name, the subsequent lambda expression describes the corresponding edge predicate, the type of the matched edge is required to be Commit Crime, that is, looking for the criminals related to the current case. In the ninth line, the matching contexts ctx is used for obtaining an intermediate result criminals p1 involved in the case, and it is required that the last name ln of p1 is not the last name of p2, so as to exclude the immediate family relationship.

crime_02 is a new case, then, with crime_02 as a starting point, the "Vulnerable Underage" graph pattern are processed to find minors in a high-risk environment, and its reverse matching process is shown in FIG. 6:

1. According to the previously defined GraphPattern and the vertice crime_02, a subgraph instance Subgraph_S0_00 is initiated and is put into the subgraph matching pool. The MatchingSteps of the subgraph instance Subgraph_S0_00 points to the corresponding matching step list, NextStep points to the first matching step, NextVertex points to crime_02, and MatchingContex and MatchinResults are empty.

2. The Subgraph_S0_00 instance is taken out from the subgraph matching pool and is deleted from the pool.

3. The working graph loader loads crime_02 and performs matching according to VP00 and EP00 in the first matching step. VP00 requires that the type of the vertex is Crime and the attribute cat is V. crime_02 meets the requirements of VP00. The working graph loader further loads all edge sets [cc02, cc03, cc04] pointing to crime_02, which all meet the requirements of EP00, that is, the types of the above edges are all Commit Crime. Therefore, the Subgraph_S0_00 instance is copied for 3 times to generate a total of 3 subgraph instances: Subgraph_S1_00, Subgraph_S1_01, and Subgraph_S1_02, the member fields of the three instances are set as corresponding values according to the matching results, as shown in FIG. 5, and the three subgraph instances are put into the subgraph matching pool, the subgraph instance Subgraph_S0_00 is destroyed.

4. The Subgraph_S1_00 instance is taken out from the subgraph matching pool and is deleted from the pool. The working graph loader loads the NextVertex vertex fred and successfully matches the vertex predicate VP01. The working graph loader loads an edge set [lw03] pointing to fred. Since the type of lw03 is Live With, which conforms to the definition of EP01, the Subgraph_S1_00 instance is copied, Subgraph_S2_00 is generated and its corresponding fields are modified, Subgraph_S2_00 is put into the subgraph matching pool, and the subgraph instance Subgraph_S1_00 is destroyed.

5. The Subgraph_S1_01 instance is taken out from the subgraph matching pool and is deleted from the pool. The working graph loader loads the NextVertex vertex edd and successfully matches the vertex predicate VP01. The working graph loader loads edge sets [lw02, con02] pointing to edd, and matches the same with the edge predicate EP01. Since only lw02 is successfully matched, the Subgraph_S1_01 instance is copied, Subgraph_S2_01 is generated and its corresponding fields are modified, Subgraph_S2_01 is put into the subgraph matching pool, and the subgraph instance Subgraph_S1_01 is destroyed.

6. The Subgraph_S1_02 instance is taken out from the subgraph matching pool and is deleted from the pool. The working graph loader loads the NextVertex vertex david and successfully matches the vertex predicate VP01. The working graph loader loads an edge set [con01] pointing to david. Since there is no edge matching with the vertex predicate VP01 in the edge set, no new subgraph instance is generated, and the subgraph instance Subgraph_S1_02 is destroyed.

7. The Subgraph_S2_00 instance is taken out from the subgraph matching pool and is deleted from the pool. The working graph loader loads the NextVertex vertex gabby and successfully matches the vertex predicate VP02. Since there is no corresponding edge predicate, the matching ends, the Subgraph_S2_00 instance is copied, Subgraph_S3_00 is generated and its corresponding fields are modified. Since Subgraph_S3_00 has completed all matching steps, it joins the final reverse matching result set. The subgraph instance Subgraph_S2_00 is destroyed.

8. The Subgraph_S2_01 instance is taken out from the subgraph matching pool and is deleted from the pool. The attribute age of the corresponding NextVertex vertex hera is 24, which does not match VP02, so Subgraph_S2_01 is destroyed after the matching.

Finally, the subgraph instance Subgraph_S3_00 completes the matching, and its corresponding matching result MatchingResults shows a complete matching path, and gabby in danger is discovered. In addition, for the sake of simplicity, the above content does not describe the judgment process of the number of loaded vertices, the number of edges and the loading time when the working graph loader loads graph data, and it is assumed that all constraints are satisfied.

Take anti application fraud as an example in the financial field is taken. In the credit card/loan application service, unqualified loan applicants often obtain loans through intermediary agents. The intermediary agents use forged incomes, properties, professions and other information to boost unqualified applicants, so as to obtain loan qualifications. Since the intermediary agents take over the loan application process, they usually leave their own mobile phone numbers or email addresses in the application materials. Therefore, auditing agencies can find the fraudulent credit card/loan applications by comparing the mobile phones and e-mail addresses in the loan applications.

Figure 7:
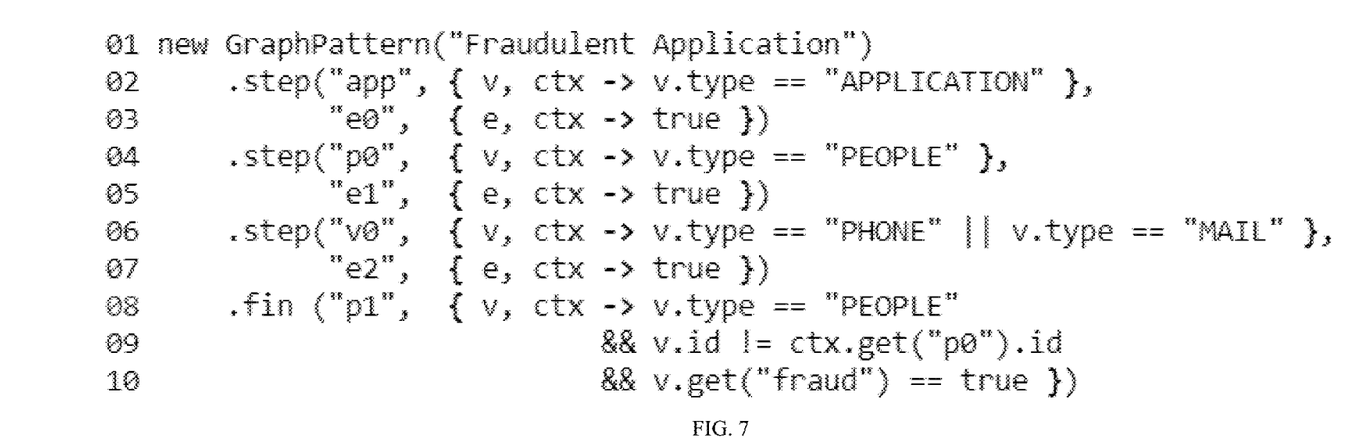
FIG. 7 is an exemplary diagram of code definition of a "Fraudulent Application" graph pattern.

In FIG. 7, GraphPattern is used to define a graph pattern that assists a loan assessing officer in fraud detection. The graph pattern requires that the phone PHONE or mailbox MAIL of the applicant cannot be consistent with those of a known fraudulent applicant. The "Fraudulent Application" graph pattern defines a search path of APPLICATION→ PEOPLE→ PHONE/MAIL→ PEOPLE. At the same time, the pattern also restricts the attributes of the last PEOPLE vertex in the path in the last matching step fin: 1) the vertex cannot be the previous PEOPLE vertex in the pattern, that is, the ids of the two vertices must be different; and 2) the fraud attribute of the vertex is true.

Figure 8:
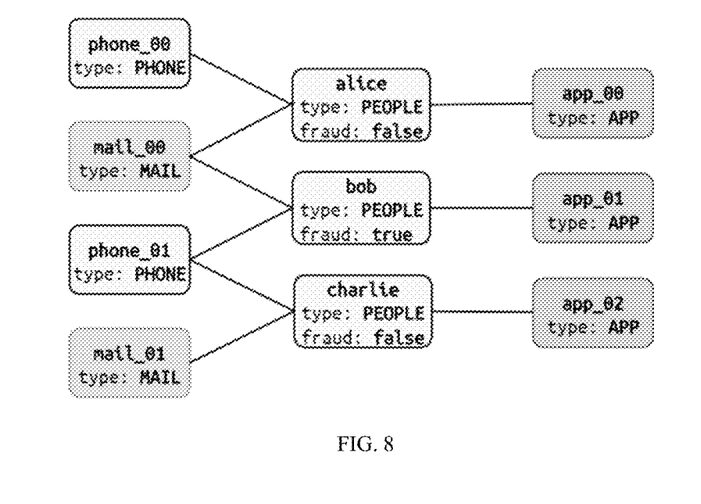
FIG. 8 is an exemplary diagram of a relationship among people in a financial application fraud prevention scene.

If the structure of an application service relationship diagram is shown in FIG. 8, and app_02 is the starting point for matching. Then "Fraudulent Application" can find the corresponding subgraph instance in the order of app_02→ charlie→ phone_01→ bob. It can be seen that app_02 is not a qualified application. Similarly, if app_03 is used as the starting point for matching, then the graph pattern cannot find a matching subgraph instance, so app_03 is a qualified application.

Considering the condition of a dynamic graph, assuming that after it is discovered that there is a problem in the application app_02, the fraud attribute of charlie is set to be true, then app_03 can find the path of app_02→ david→ mail_01→ charlie, and app_03 will also become an unqualified application. Assuming that app_02 and app_03 arrive within a very small time period, but due to the large matching calculation delay, the fraud attribute of charlie cannot be set to be true in time, then the application app_03 will fail to find the subgraph matching "Fraudulent Application", and thus is successfully approved. Therefore, the matching speed of the graph pattern is very important to ensure the correctness of the service.

It should be noted that when the data compression apparatus provided in the foregoing embodiment performs data compression, division into the foregoing functional modules is used only as an example for description. In an actual application, the foregoing functions can be allocated to and implemented by different functional modules based on a requirement, that is, an inner structure of the apparatus is divided into different functional modules, to implement all or some of the functions described above. For details about a specific implementation process, refer to the method embodiment. Details are not described herein again.

All or some of the foregoing embodiments may be implemented by using software, hardware, firmware, or any combination thereof. When the software is used for implementation, all or some of the embodiments may be implemented in a form of a computer program product. The computer program product includes one or more computer instructions. When the computer program instructions are loaded and executed on a server or a terminal, all or some of the procedures or functions according to the embodiments of this application are generated. The computer instructions may be stored in a computer-readable storage medium or may be transmitted from a computer-readable storage medium to another computer-readable storage medium. For example, the computer instructions may be transmitted from a web site, computer, server, or data center to another web site, computer, server, or data center in a wired (for example, a coaxial optical cable, an optical fiber, or a digital subscriber line) or wireless (for example, infrared, radio, or microwave) manner. The computer-readable storage medium may be any usable medium accessible by a server or a terminal, or a data storage device, such as a server or a data center, integrating one or more usable media. The usable medium may be a magnetic medium (for example, a floppy disk, a hard disk, or a magnetic tape), an optical medium (for example, a digital video disk (DVD)), or a semiconductor medium (for example, a solid-state drive).

The above-mentioned embodiments are used for explaining the present disclosure, instead of limiting the present disclosure. Any modifications and changes made to the present disclosure, within the spirit of the present disclosure and the protection scope of the claims, shall all fall into the protection scope of the present disclosure.

What is claimed is:

1. A method for reverse real-time matching based on event-driven graph patterns, wherein the method comprises the following steps:

(1) definition of a graph pattern:

the graph pattern is used to describe a spatial connection relationship among vertices and edges in a graph in a reverse order and attribute constraints thereof, and specifically, comprising a linked list of matching steps and matching contexts;

the matching contexts is used for storing intermediate results of a matching process, and supporting matching conditions of non-adjacent vertices or edges;

the linked list of matching steps comprises matching steps connected in series in a form of a linked list, and each matching step comprises the following content:

a. Vertex Predicate (vp for short): according to various attributes of a vertex, combined with the matching contexts, determining whether the current vertex meets the matching conditions;

b. Edge Predicate (ep for short): according to the various attributes of an edge, combined with the matching contexts, determining whether the current edge meets the matching conditions;

(2) establishment of reverse matching architecture:

the reverse matching architecture supports graph pattern matching and graph pattern management, comprising the following components:

a. a session manager: responsible for creating and managing a matching session, restricting the behavior of the matching session according to session configuration information, and managing the life cycle of the matching session; the session manager is further responsible for adding and deleting all graph patterns, and limiting the number of concurrent matching sessions;

b. a matching session: when receiving a matching request, the session manager creates a matching session to perform an actual graph matching operation; the matching session comprises a working graph loader, a working graph, a graph pattern matcher and a subgraph matching pool, and after the matching ends, the session manager returns to a result set and ends the life cycle of the matching session;

the working graph loader: according to the matching requirements and progress, loading corresponding vertices and edges from an underlying graph data storage (Graph Storage) to form a working graph for reverse matching, the working graph loader also needs to abide by various conditional constraints issued by the session manager to the matching session, so as to prevent the matching process from occupying too many resources or time;

the working graph: loading the related underlying graph data into the current matching session, so that the graph pattern matcher can quickly access and traverse the underlying graph data;

the subgraph matching pool: used for storing subgraph instances generated according to different graph patterns and matching progresses; the subgraph instance comprises the following content:

MatchingSteps: pointing to the linked list of steps of the graph pattern corresponding to the current subgraph instance;

NextStep: pointing to the next matching step required for matching the current subgraph instance;

NextVertex: pointing to the next vertex that needs to be loaded and matched, and the working graph loader loads into the working graph during the next matching step;

MatchingContext: pointing to the matching context generated in a subgraph matching process, implemented in a data structure of a dictionary, and storing intermediate results of the matching process and information that needs to be temporarily stored in a form of key value pairs;

MatchingResult: the matching result records the various vertices and edges that meet the matching step in a form of a list;

the graph pattern matcher: controlling the complete process of reverse matching;

c. session configuration: storing relevant configuration parameters of the matching session, comprising: the maximum number of vertices of the working graph, the maximum number of edges of the working graph, the maximum traversal depth and the maximum matching duration;

d. registered graph patterns: containing all graph patterns that need to be matched in real time, as well as the mapping relationships between events and the graph patterns;

(3) reverse matching method:

(3.1) after receiving an event, the session manager initializes the entire matching process, comprising:

(3.1.1) the session manager looks for a set of corresponding starting vertices from the received event according to requirements, and looks for a graph pattern corresponding to the current event from the registered graph patterns; if the corresponding starting vertices cannot be found, or if the corresponding graph pattern cannot be found, the session manager directly returns an empty result set;

(3.1.2) the session manager creates a corresponding matching session according to the session configuration, initializes the graph pattern matcher, the subgraph matching pool and the working graph loader; at the same time, the session manager constructs a corresponding subgraph instance according to the starting vertices and the graph pattern, and places the subgraph instance in the subgraph matching pool;

(3.2) the graph pattern matcher traverses the subgraph instances in the subgraph matching pool, and performs the following loop operations:

(3.2.1) taking out the current subgraph instance and deleting it from the subgraph matching pool;

(3.2.2) looking for the vertex corresponding to NextVertex of the current subgraph instance from the working graph, and verifying whether NextVertex meets the attribute constraints of the vertex predicate in NextStep; if the NextVertex does not meet the constraints, destroying the current subgraph instance and returning to step (3.2.1) to take the next subgraph instance; if the NextVertex meets the constraints, adding the vertex into a matching result list MatchingResult of the current subgraph instance and continuing the next operation;

(3.3.3) if the edge predicate in NextStep is empty, ending the matching, adding the current matching subgraph instance into the result set, and returning to step (3.2.1); if the edge predicate in NextStep is not empty, continuing to load all edges pointing to NextVertex and determining whether the loaded edges meet the attribute constraints of the edge predicate one by one, if an edge e that meets the attribute constraints of the edge predicate is found, the graph pattern matcher will copy the current subgraph instance and perform the following operations:

a. adding the edge e into the MatchingResult of the copied subgraph instance;
b. setting NextVertex of the new instance as a starting vertex of the edge e;
c. setting NextStep of the new instance as a subsequent matching step of the current matching step;
d. finally, the graph pattern matcher adds the new subgraph instance into the subgraph matching pool;

after traversing of all edges, the graph pattern matcher destroys the current subgraph instance;

(3.3) repeating step (3.2), until one of the following conditions is met:

a. the subgraph matching pool is empty, and there is no subgraph instance for matching;
b. the scale of the working graph exceeds a limit in the session configuration, comprising: the number of vertices or edges in the working graph exceeds the limit, or the depth of the working graph exceeds the limit;
c. the time of the entire reverse matching exceeds a pre-configured time limit; and (3.4) the graph pattern matcher returns to the result set, clears the subgraph matching pool and the working graph, and ends the current matching session.

2. The method for reverse real-time matching based on event-driven graph patterns according to claim 1, wherein the attributes of the vertices or edges are used for describing the features or categories of the vertices or edges themselves.

3. The method for reverse real-time matching based on event-driven graph patterns according to claim 1, wherein the graph pattern further comprises a next step pointer, which points to the next matching step in the linked list of matching steps.

* * * * *